(12) United States Patent  
Tanida et al.

(10) Patent No.: US 6,594,882 B1  
(45) Date of Patent: Jul. 22, 2003

(54) MOTOR MANUFACTURING METHOD USING SINGLE PLATE FOR YOKE

(75) Inventors: Fumihiro Tanida, Kosai (JP); Matsuo Yamashita, Kosai (JP); Kazuhiko Nagasaka, Kosai (JP)

(73) Assignee: Asmo Co., Ltd., Kosai City (JP)

( * ) Notice: Subject to any disclaimer, the term of this patent is extended or adjusted under 35 U.S.C. 154(b) by 0 days.

(21) Appl. No.: 09/438,015

(22) Filed: Nov. 10, 1999

(30) Foreign Application Priority Data

Nov. 30, 1998 (JP) ............................................. 10-340440

(51) Int. Cl.⁷ ............................................. H02K 15/16
(52) U.S. Cl. ..................... 29/596; 29/521; 310/40 MM; 310/154; 310/89
(58) Field of Search ......................... 29/596, 525, 598, 29/521; 417/360, 423.15, 371; 310/40 MM, 154.08, 228, 89, 91, 42, 154.09, 192, 256; 72/170, 173

(56) References Cited

U.S. PATENT DOCUMENTS

| 3,445,692 A | * | 5/1969 | Masao ........................ 310/42 |
| 3,818,585 A | * | 6/1974 | Preece ........................ 29/596 |
| 4,309,815 A | * | 1/1982 | Schmitt et al. ............... 29/596 |
| 4,409,505 A | * | 10/1983 | Peterson ....................... 310/90 |
| 4,473,766 A | * | 9/1984 | Obergfell et al. ........... 310/216 |
| 4,783,906 A | * | 11/1988 | Gingerich et al. ............ 29/827 |
| 5,160,867 A | * | 11/1992 | Niemela ...................... 310/154 |
| 5,426,337 A | * | 6/1995 | Kobayashi et al. ........... 310/89 |
| 5,977,673 A | * | 11/1999 | Iwata ........................... 310/90 |
| 6,104,109 A | * | 8/2000 | Sato ...................... 310/40 MM |

FOREIGN PATENT DOCUMENTS

JP 58-180784 * 10/1983 ................ 417/360

* cited by examiner

*Primary Examiner*—Peter Vo  
*Assistant Examiner*—Minh Trinh  
(74) *Attorney, Agent, or Firm*—Fish & Richardson P.C.

(57) ABSTRACT

In a motor yoke manufacturing method, a flat metal plate is die-cut into a base plate for a yoke which comprises a bottom wall and a side wall. The base plate is plastically deformed to form a bearing accommodating holder and protrusions on the bottom wall. After a bearing member is placed in the bearing accommodating holder, a resilient plate is placed in contact with the bearing member and the protrusions are plastically deformed to tightly fix the resilient plate to the bottom wall. The base plate is plastically deformed to shape a generally bottomed cylindrical configuration of the yoke. Thus, the yoke is manufactured without a flushing process for removing machining oil or machining debris.

5 Claims, 12 Drawing Sheets

MOTOR MANUFACTURING METHOD USING SINGLE PLATE FOR YOKE

CROSS REFERENCE TO RELATED APPLICATION

This application relates to and incorporates herein by reference Japanese Patent Application No. 10-340440 filed on Nov. 30, 1998.

BACKGROUND OF THE INVENTION

1. Field of the Invention

The present invention relates to an electrical motor used for an electrical device and its manufacturing method.

2. Related Art

Small-sized electrical motors which are used for vehicular electrical devices, audio devices or the like have a bottomed cylindrical yoke and a rotor disposed within the yoke. The yoke holds permanent magnets therein and forms a part of a magnetic circuit. The yoke is shaped by deep-drawing a metal plate. A bearing is fixed on the bottom of the yoke to support a rotary shaft of the rotor to enable rotation of the rotor.

In manufacturing the yoke, the metal plate is first deep-drawn into a bottomed cylindrical shape, and then the bearing is fixed after flushing the deep-drawn yoke to remove the machining oil used in the deep-drawing, machining debris and the like.

If the deep-drawn yoke is subjected to the flushing process after the bearing is fixed to the yoke, oil provided in the bearing will also be unnecessarily removed thus lessening the function of the bearing. Further, the bearing cannot be fixed before or during the deep-drawing process, because the thickness of the metal plate changes between before and after the deep-drawing process. Thus, the conventional motor requires an increased number of manufacturing processes and thus lowers the manufacturing efficiency.

SUMMARY OF THE INVENTION

It is therefore an object of the present invention to provide an electrical motor manufacturing method which reduces the number of manufacturing processes and increases manufacturing efficiency.

According to the present invention, a flat metal plate is die-cut into a base plate shaped to include a bottom wall and a side wall unitary with the bottom wall. A bearing member for supporting a rotary shaft of an electrical motor is fitted substantially in a center of the bottom wall of the base plate.

The base plate is bent at a junction between the bottom wall and the side wall, and the side wall is bent in correspondence with an outer peripheral configuration of the bottom wall, thereby forming a bottomed cylindrical yoke of the electrical motor.

Preferably, a through hole for passing the rotary shaft therethrough is formed in the center of the bottom wall of the base plate at the same time as the die-cutting of the metal plate. A central part of the bottom wall of the base plate is plastically deformed to provide a bearing holder in the bottom wall for rotatably accommodating the bearing member in the bearing holder.

Preferably, the bearing member is placed on the bottom wall of the base plate, a resilient member is placed on the bearing member, and the resilient member is tightly fixed to the bottom wall of the base plate to resiliently bias the bearing member toward the bottom wall of the base plate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments which are directed to a vehicular washer system. The same or like numerals are used to designate the same of like parts throughout the embodiments.

First Embodiment

Figure 1:
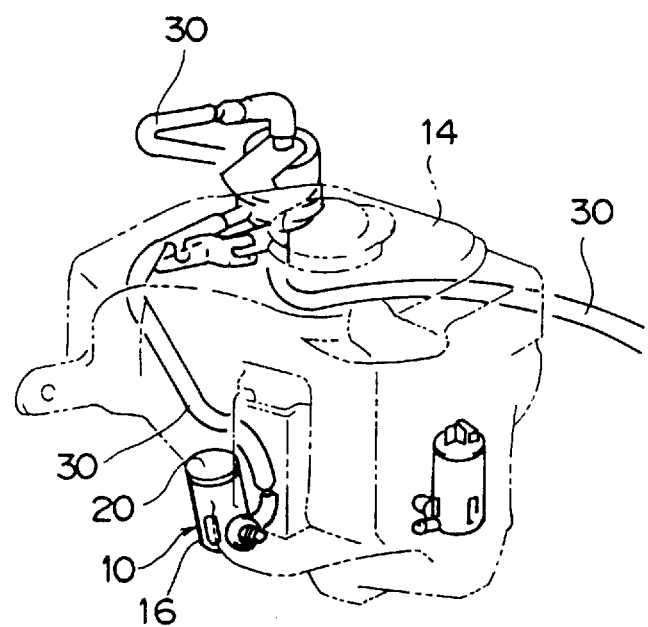
FIG. 1 is a perspective view showing a washer tank using an electrical motor manufactured according to a first embodiment of the present invention.
Figure 2:
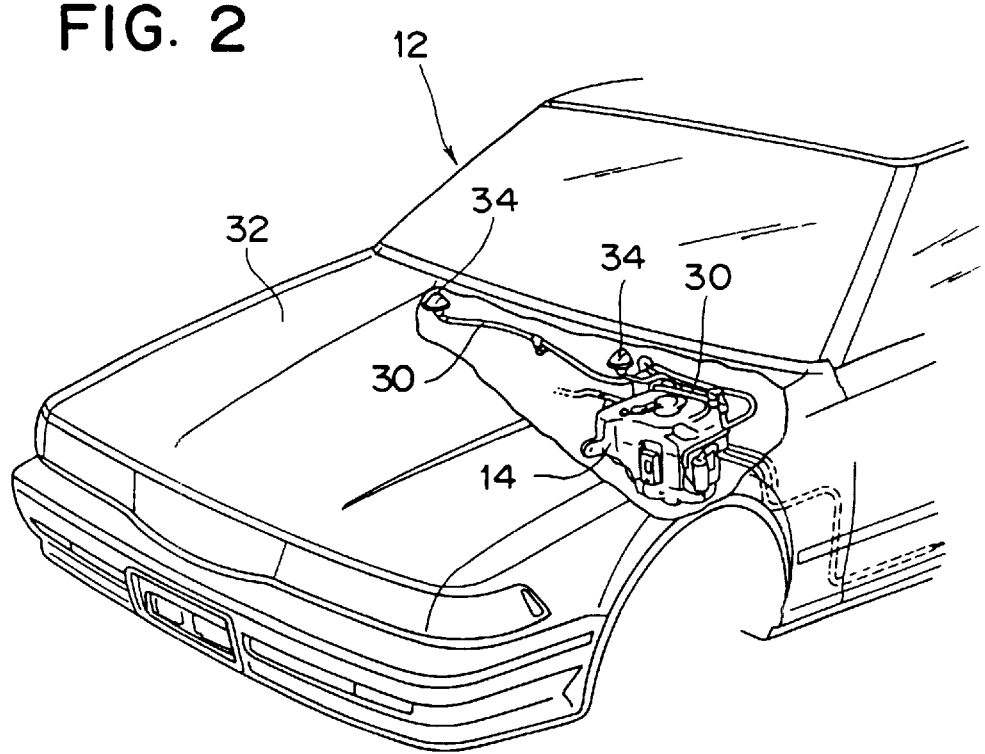
FIG. 2 is a perspective view showing the washer tank mounted in a vehicle.
Figure 3:
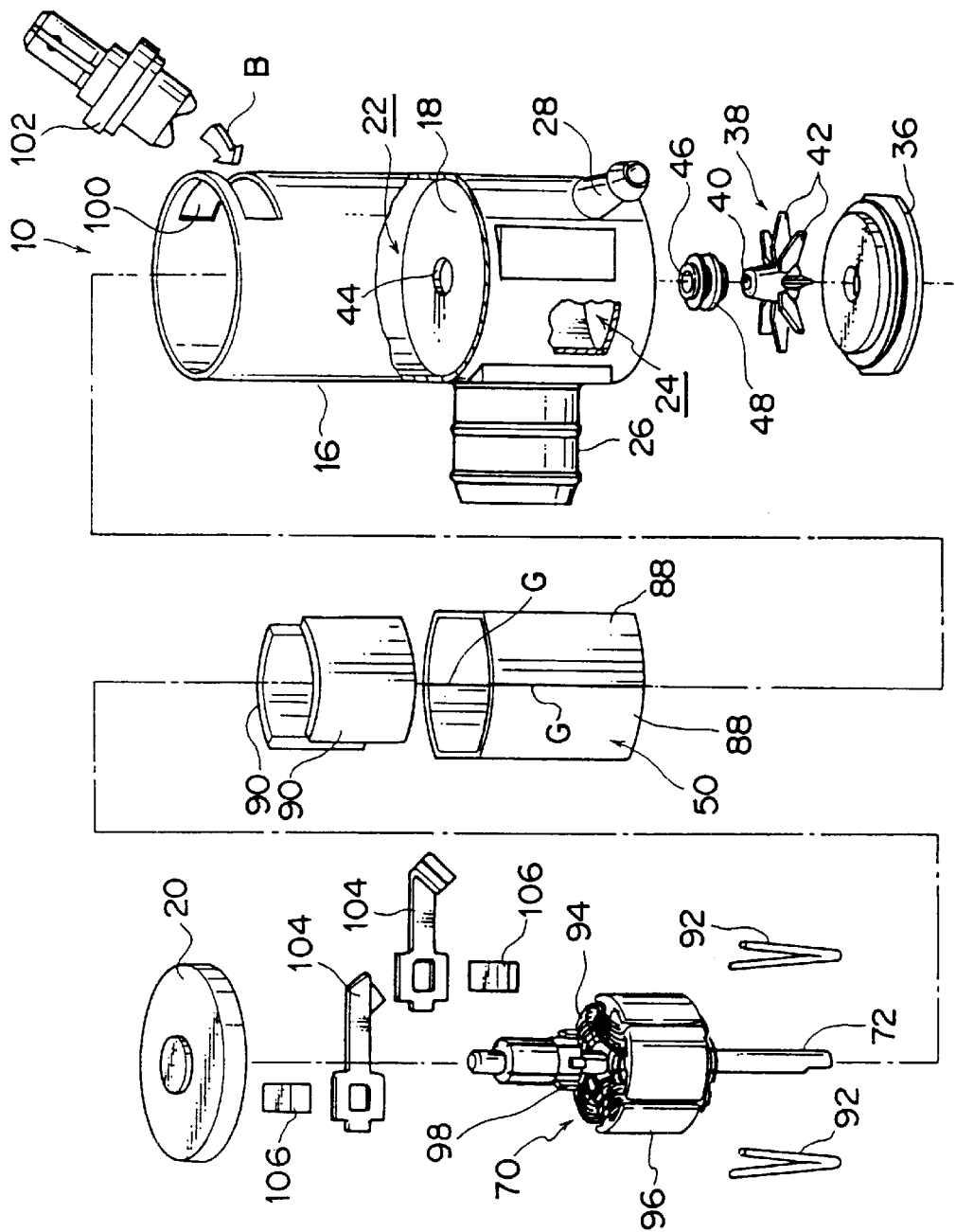
FIG. 3 is an exploded view showing the electrical motor according to the first embodiment of the present invention.

Referring first to FIGS. 1, 2 and 3, an electrical motor 10 is disposed outside of a washer tank 14 near the bottom of the side wall of the washer tank 14. The motor 10 has a casing 16 which is made of a synthetic resin and generally shaped in a cylindrical configuration having openings at both the top and bottom ends. The casing 16 has an intermediate partition wall 18 to define a motor chamber 22 at its upper side and a washer fluid passage 24 at its lower side.

An inlet port 26 and an outlet port 28 are cylindrically-shaped, and provided on the lower outer periphery of the casing 16 to protrude outwardly in a radial direction. The inlet port 26 has one end communicated with the passage 24, and the other end fitted in the fitting hole formed in the side wall of the washer tank 14 to communicate with the inside of the washer tank 14. Thus, the washer fluid in the washer tank 14 is sucked into the passage 24 when a vacuum pressure is generated in the inlet 26. The outlet port 28 also has one end communicated with the passage 24, and the other end is connected via a hose 30 to a washer nozzle 34 mounted on a hood 32 of a vehicle 12.

As shown in FIG. 3, a bottom cover 36 is fluid-tightly fitted in the bottom of the casing 16 to close the bottom opening of the casing 16, that is, the bottom opening of the passage 24. An impeller 38 is disposed in the passage 24. The impeller 38 is formed with a fitting part 40 at its radial center so that the lower end of a rotary shaft 72 of a rotor 70 is fixedly fitted in the fitting part 40. The impeller 38 has a plurality of vanes 42 protruding outwardly from the outer periphery of the fitting part 40 in the radial direction. When the impeller 38 rotates and the vanes 42 generate the vacuum pressure in the inlet port 26, the washer fluid is sucked in from the washer tank 14 and is fed out to the outlet port 28 under pressure.

The intermediate wall 18 is formed with a through hole 44 at its radial center so that a seal member 84 is fitted in the hole 44. The seal member 84 has a through hole 46 at its radial center to pass the lower end of the rotary shaft 72 therethrough.

The casing 16 accommodates the yoke 50 in its motor chamber 22. As shown in FIGS. 4 to 7, the yoke 50 has a side wall 88 and a bottom wall 54. The side wall 88 is defined by two opposing parallel walls and two opposing arcuate walls connecting the opposing parallel walls. The bottom wall 54 is defined with two parallel opposing sides and with two opposing arcuate sides. The bottom wall 54 is formed with a bearing accommodating protrusion 56 at its radial center. The protrusion 56 protrudes from the lower surface side in the downward direction in FIG. 4 (upward direction in FIG. 7), and has a concavity or recess in the opposite upper surface side. The protrusion 56 accommodates a bearing metal 56 in its concavity in a manner that the outer periphery of the bearing metal 58 is in abutment with the concavity.

The bearing metal 58 is generally in a spherical shape but has two opposing flat-cut parallel surfaces. A bearing hole 60 is provided thorough the parallel surfaces. The bearing metal 56 is positioned in the concavity so that the parallel surfaces are in parallel with the bottom wall 54, thereby holding the bearing hole 60; in perpendicular relation with the bottom wall 54.

A through 62 is formed in the radial center of the bottom wall 54, more specifically, in the radial center of the protrusion 56. Thus, when the rotor 70 is placed inside the yoke 50, the rotary shaft 72 of the rotor 70 passes through the bearing hole 60 and the through hole 62.

Figure 4:
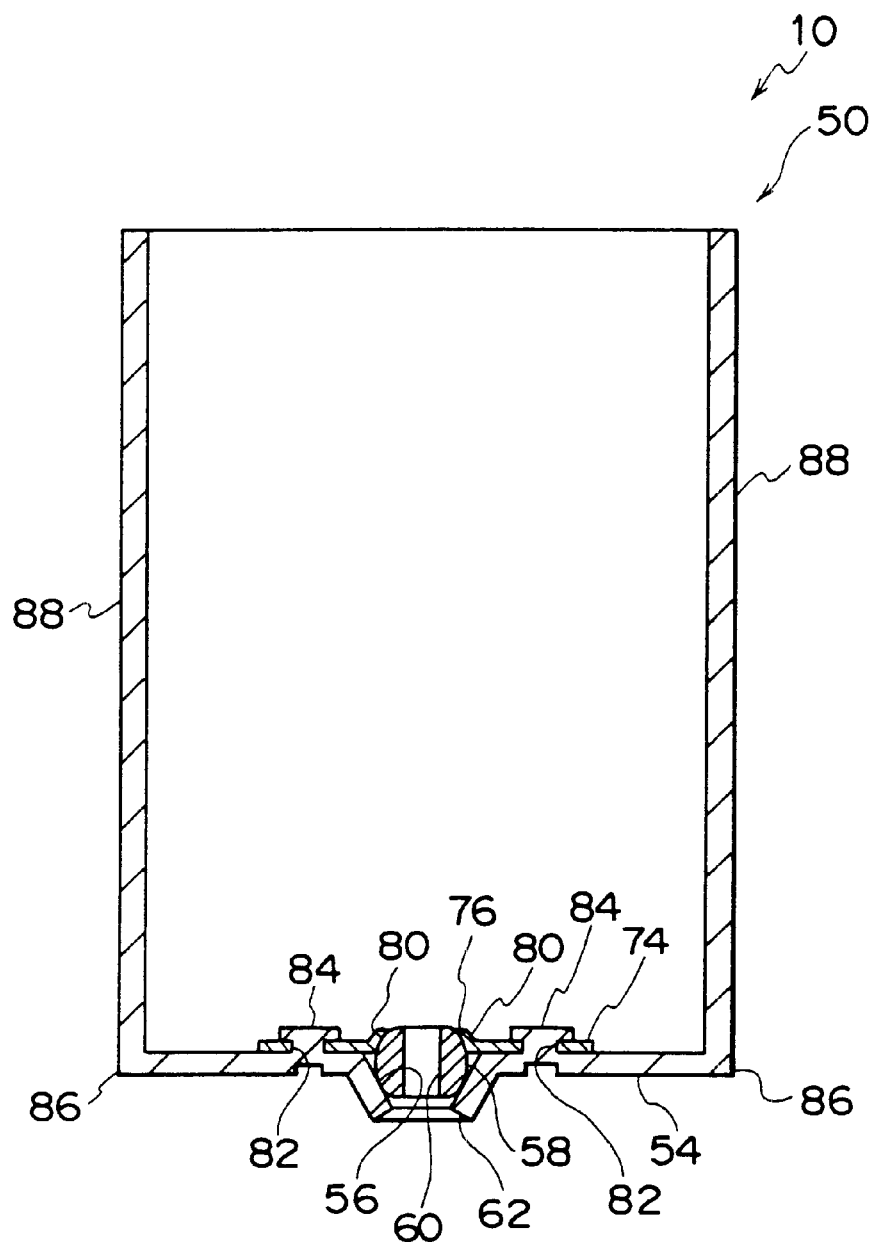
FIG. 4 is a sectional view showing a yoke used in the electrical motor shown in FIG. 3.
Figure 5:
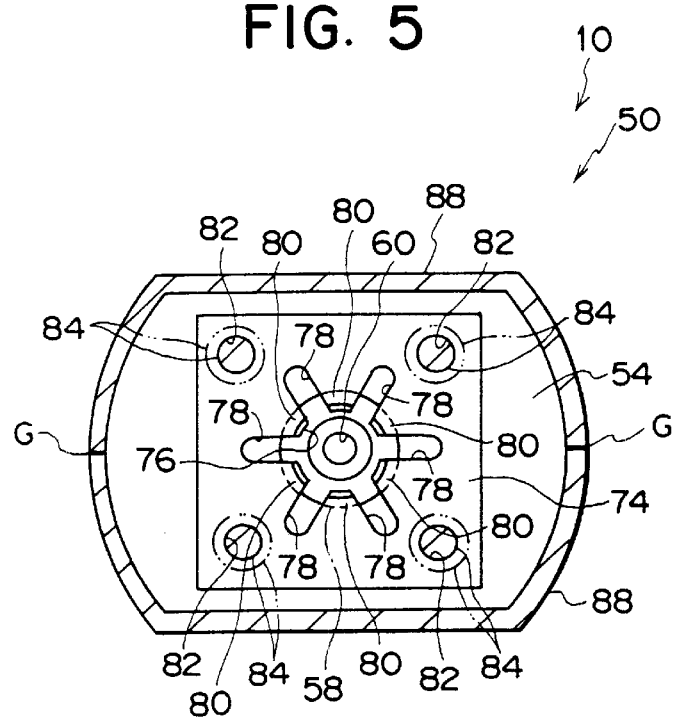
FIG. 5 is a sectional plan view showing a bottom wall and a side wall of the yoke shown in FIG. 4.

As shown in FIGS. 4 and 5, a square-shaped resilient plate 74 is disposed on the upper surface of the bottom wall 54. The resilient plate 74 may alternatively be in a circular disk shape. The resilient plate 74 has a through hole 76 at its radial center for passing the rotary shaft 72 therethrough. The through hole 76 has a diameter larger than that of the rotary shaft 72 so that the rotary shaft 72 passes through the through hole 76 when the rotor 70 is assembled in the yoke 50. A plurality of slits 78 is formed to extend radially from the through hole 76. Thus, the resilient plate 74 has a plurality of tongue-shaped spring parts 80. Each spring part 80 has a free end on the side of the through hole 76 so that it may flex in the plate thickness direction with respect to the non-free end thereof which is opposite the free end.

The plate 74 has four through holes 82 near its four corners. Four protrusions 84 pass through the holes 82, respectively, and the top ends are plastically deformed to provide flattened or enlarged heads to restrict the protrusions 84 from disengaging from the through holes 82. Thus, the plate 74 is tightly fixed to the bottom wall 54 by the plastically deformed protrusions 84, so that the through hole 76, bearing hole 60 and the through hole 62 are aligned coaxially. As a result, the plate 74 thus resiliently presses and holds the bearing metal 56 in position with its free ends being in abutment with the upper outer peripheral surface of the bearing metal 56.

Figure 7:
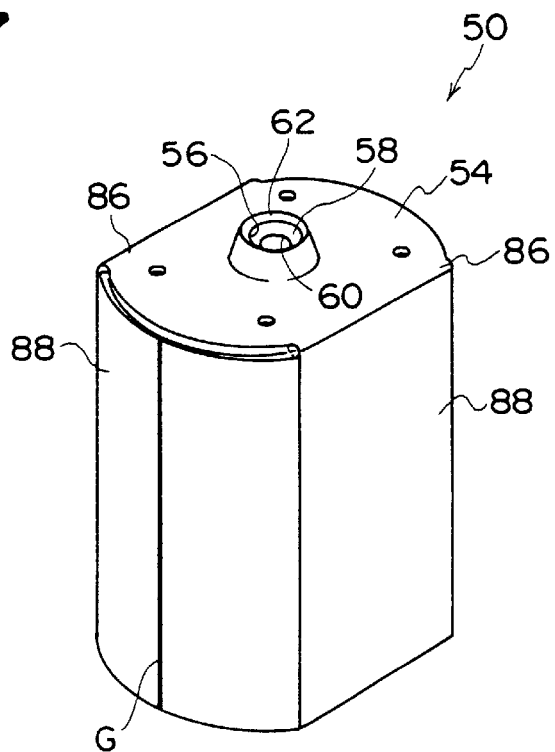
FIG. 7 is a perspective view showing the yoke shown in FIG. 6 under a condition that the yoke is seen from the bottom side.
Figure 8:
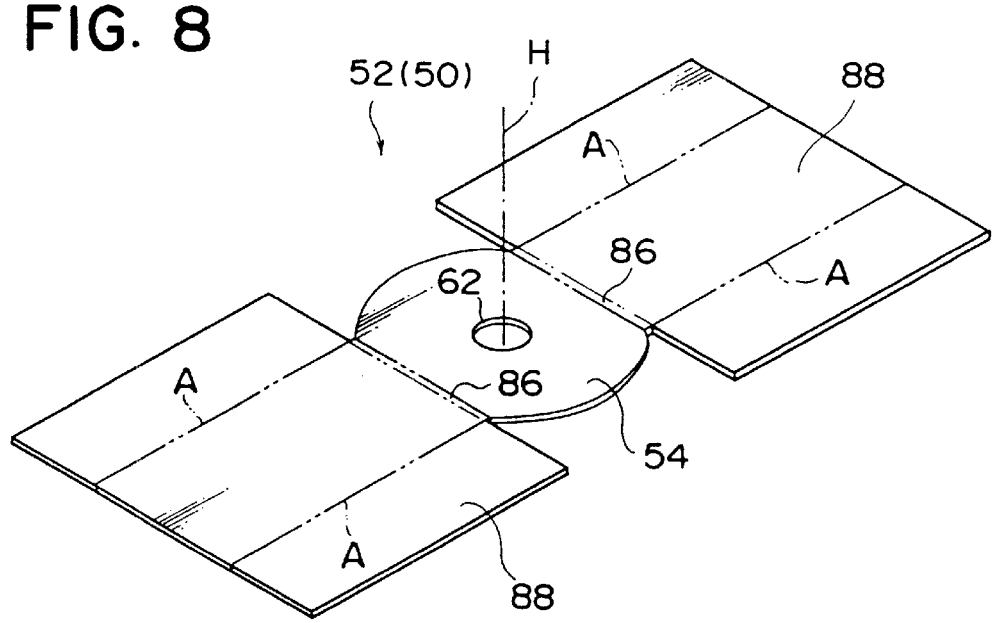
FIG. 8 is a perspective view showing a base plate which is shaped into the yoke shown in FIG. 6.
Figure 9:
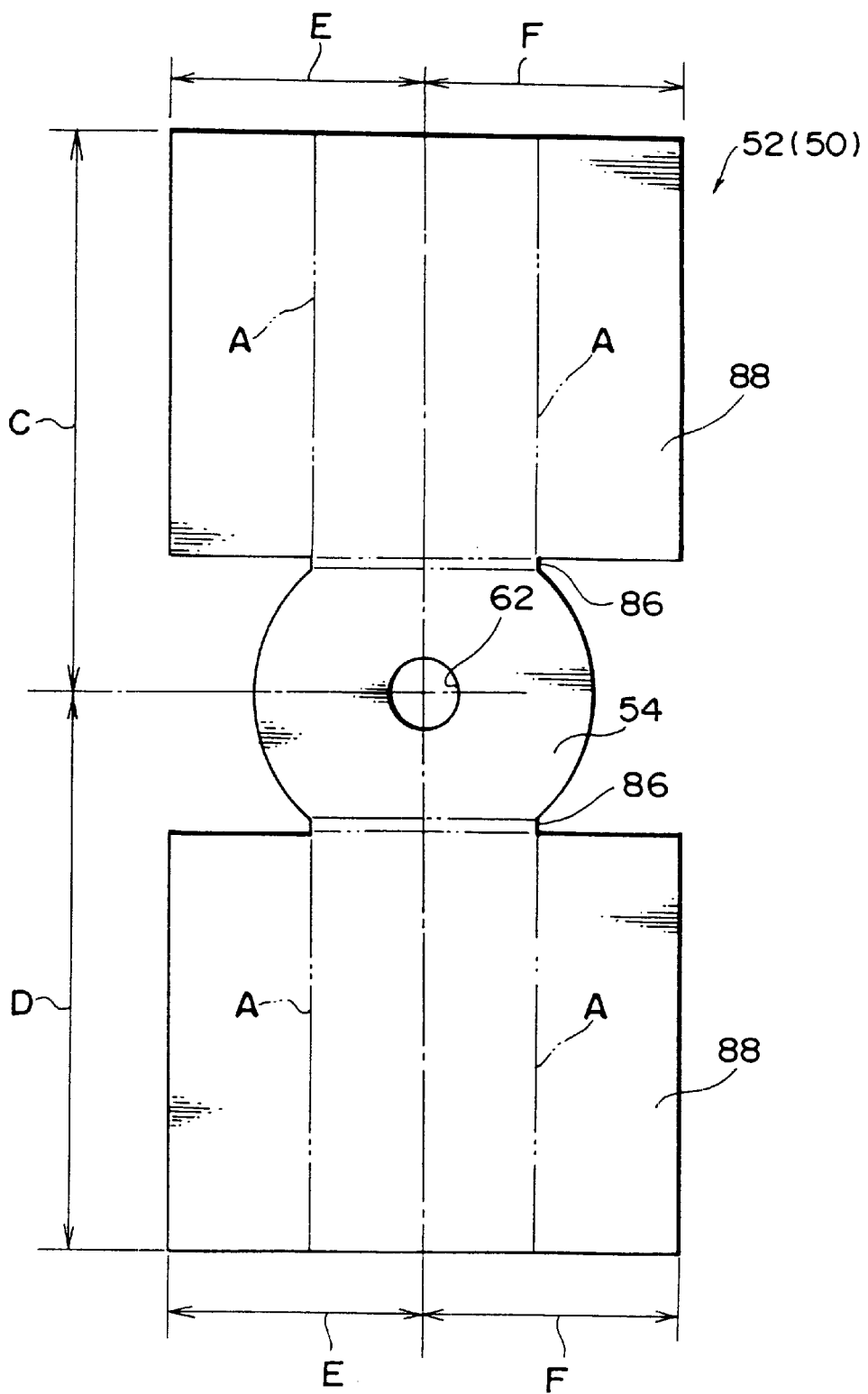
FIG. 9 is a plan view showing the base plate shown in FIG. 8.

The yoke 50 is manufactured from a base plate 52 shown in FIGS. 8 and 9. A pair of side walls 88 extend from the two opposing parallel sides in the opposite directions from each other through a bending width 86 which is slightly larger than the plate thickness. Each side wall 88 has the same rectangular shape. That is, the base plate 52 has the same longitudinal lengths C and D measured from the center of the through hole 62 to the rectangle ends which correspond to the top end in FIGS. 3 and 4. Further, the base plate 52 has the same lateral lengths (widths) E and F measured from the center of the through hole 62 to the rectangle sides which meet on the line G as shown in FIGS. 3 and 7. The total width of each side wall 88 (sum of widths E and F) is defined to be a half of the total peripheral length of the bottom wall 54.

Referring back to FIG. 3, a pair of permanent magnets 90 shaped arcuately are disposed in the yoke 50 along the arcuate parts of the side wall 88 in a manner that the inner surfaces thereof face each other. A pair of V-shaped springs 92 are disposed on the inside of the parallel opposing surfaces of the side wall 88 and in abutment with the side ends of the permanent magnets 90. Thus, the springs 92 press the permanent magnets 90 toward the arcuate parts of the side wall 88 to hold the same in position. Specifically, the permanent magnets 90 thus pressed by the springs 92 are positioned symmetrically with respect to the central axis of the rotor 70 with its lateral center being in alignment with the contact line G where the ends of the rectangles of the side wall 88 meet.

The rotor 70 is disposed inside the permanent magnets 90 in the yoke 50. The rotor 70 is fixedly supported around the rotary shaft 72. The rotary shaft has the end which passes through the intermediate wall 18 and is fitted with the fitting part 40 of the impeller 38 in the passage 24. The rotor 70 has a core 96 having a plurality of slots in which a plurality of coil windings 94 are wound. The core 96 may comprises a stack of thin silicon steel plates, although not limited thereto. A commutator 98 having a plurality of commutator pieces are fixed to the rotary shaft 72 at a position adjacent the core 96. The commutator 98 is coaxial with the core 96 and the rotary shaft 72, and the commuator pieces are electrically connected to the coil windings 94.

The casing 16 has an opening 100 near its upper end, so that an electrical terminal connector 102 is inserted therethrough in the direction B. The terminal connector 102 is electrically connectable to a storage battery (not shown) of the vehicle through a washer control switch (not shown).

A pair of brushes 106 which are held by a pair of brush holders 104 in the casing 106 are electrically connected to the terminal connector 102 so that the coil windings 94 are selectively energized through the terminal connector 102, the brushes 106 and the commutator 98.

A lid 20 is fitted with the top opening of the casing 16 to close the motor chamber 22. The lid 20 also has a bearing accommodating protrusion at its radial center to accommodate the other end of the rotary shaft 72 therein through a bearing (not shown) in the similar manner as the bearing accommodating protrusion 56.

In the above motor 10, the rotor 70 rotates by the magnetic attraction and repulsion between the magnetic forces of the coil windings 94 and the permanent magnets 90, when the coil windings 94 are selectively energized through the brushes 106. Although the rotary shaft 72 of the rotor 70 is supported in the bearing hole 60 through the bearing metal 58, it is likely that the rotary shaft 72 will incline from the axis of the bearing hole 60 under the condition that the rotor 70 is mounted inside the yoke 50.

In the present embodiment, however, the bearing metal 58 is sandwiched between the bottom wall 54 and the resilient plate 74 while being pressed by the biasing force of the spring parts 80. Further, the bearing metal 58 is generally in a spherical shape except the flat-surfaced parts. As a result, the bearing metal 56 is rotatable to some extent around its axis against the pressing force of the spring parts 80, while being held sandwiched between the bottom wall 54 and the resilient plate 74. Thus, when the rotary shaft 72 is fitted in the bearing hole 60, the bearing metal 58 rotates about its axis with the pressing force applied from the rotary shaft 72 to the inner peripheral part of the bearing hole 60 until the axis of the bearing hole 60 substantially coincides with the longitudinal axis of the rotary shaft 72. The bearing metal 58 thus supports the rotary shaft 72 without exerting an external force which may incline the rotary shaft 72. The bearing metal thus does not lessen the efficiency of rotation of the motor 10.

The process of manufacturing the motor 10, particularly the yoke 50, is described next in detail.

Figure 10:
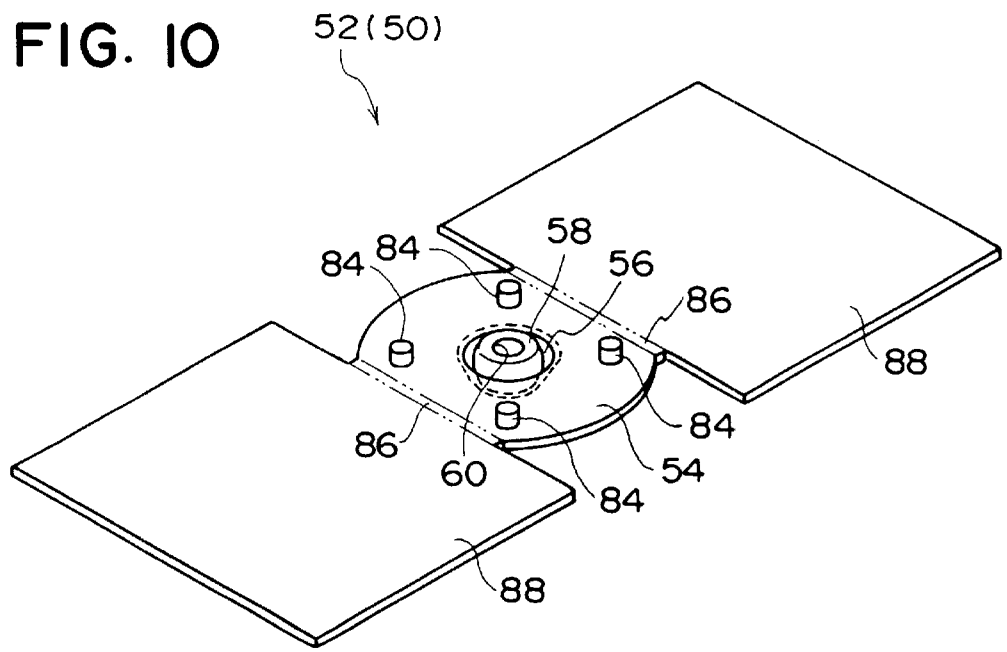
FIG. 10 is a perspective view showing the base plate after a bearing metal is placed in a bearing holder.

First, in a press-machining process, a flat metal plate is die-cut or punched into the shape of the base plate 52 shown in FIGS. 8 and 9, and the bottom wall 54 is plastically deformed by pushing a die so that the bearing accommodating holder 56 and the protrusions 84 are formed at the same time as shown in FIG. 10. Each protrusion 84 is formed to protrude from the upper surface of the bottom wall 54 in a cylindrical shape by pushing the lower surface of the bottom wall 54.

The base plate 52 is generally in a flat shape under this condition, although the accommodating holder 56 and the protrusions 84 are formed. In this single press-machining process in which the die is shaped and used to cut and push the metal plate, not only the outer peripheral configuration of the base plate 52 is shaped, but also the accommodating holder 56 and its through hole 62 are formed in the center of the bottom wall 54. As a result, the through hole 62 can be positioned more accurately relative to the side wall 88 to prevent the rotary axis of the rotary shaft 72 from deviating than in the case the bottom wall 54 and the side wall 88 are provided separately and the bottom wall 54 is fitted with the side wall 88.

Next, in a bearing setting process, the bearing metal 58 is placed in position in the accommodating member 56 as shown in FIG. 10.

Figure 11:
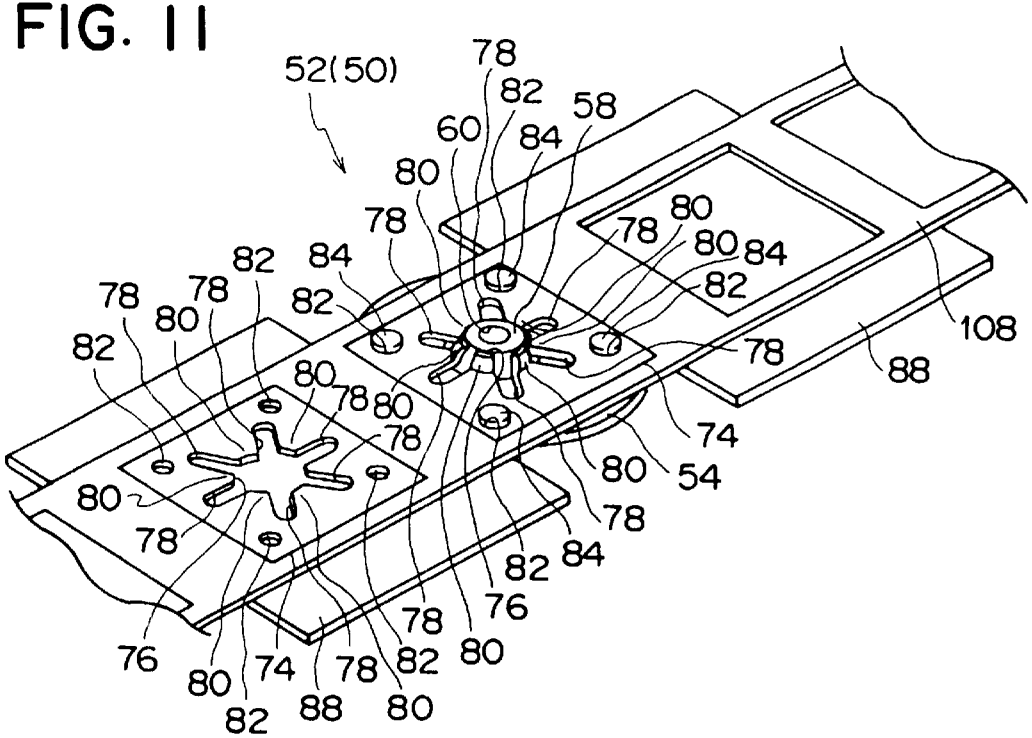
FIG. 11 is a perspective view showing a resilient plate placed on the base plate.

Further, in a plate sandwiching process and a bearing setting process, as shown in FIG. 11, an elongated flat metal band 108 is placed as a resilient plate on the base plate 52 at the side of opening of the accommodating holder 56, that is, on the upper surface of the base plate 52. The metal band 108 is a series of the resilient plates 74 each of which includes the through hole 76, slits 78 and through holes 82. The metal band 108 is sandwiched together with the base plate 52 between a pair of dies (male and female), under a condition that the most end side one of the through holes 76 formed at a plurality of locations at every predetermined spaced interval in the direction of elongation is positioned coaxially with the through hole 62.

The protrusions 84 are fitted in the through holes 82 under the condition that the metal band 108 is sandwiched between the dies. The protrusions 84 are then plastically deformed by the dies. Thus, the protrusions 84 have the enlarged heads which are larger in diameter than the through holes 82. Then, the metal band 108 is die-cut into the resilient plate 54 by the dies.

The spring parts 80 of the resilient plate 74 presses the bearing metal 58 toward the upper surface of the accommodating holder 56 under the condition that the resilient plate 74 is thus fixed to the base plate 52. Thus, the bearing metal 58 is sandwiched between the spring parts 80 of the resilient plate 74 and the bottom wall 54.

Figure 6:
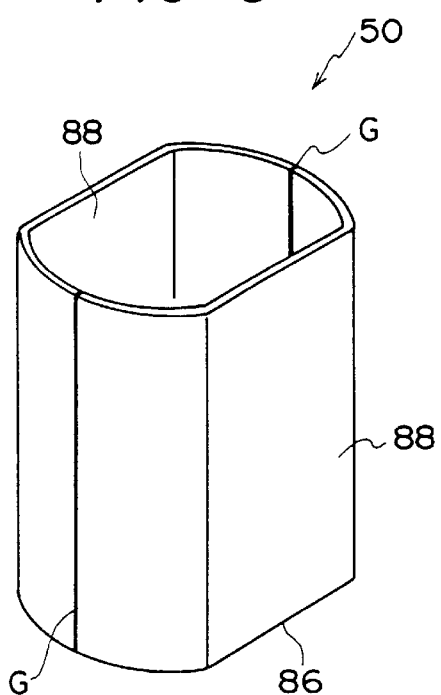
FIG. 6 is a perspective view showing the yoke shown in FIG. 3.
Figure 12:
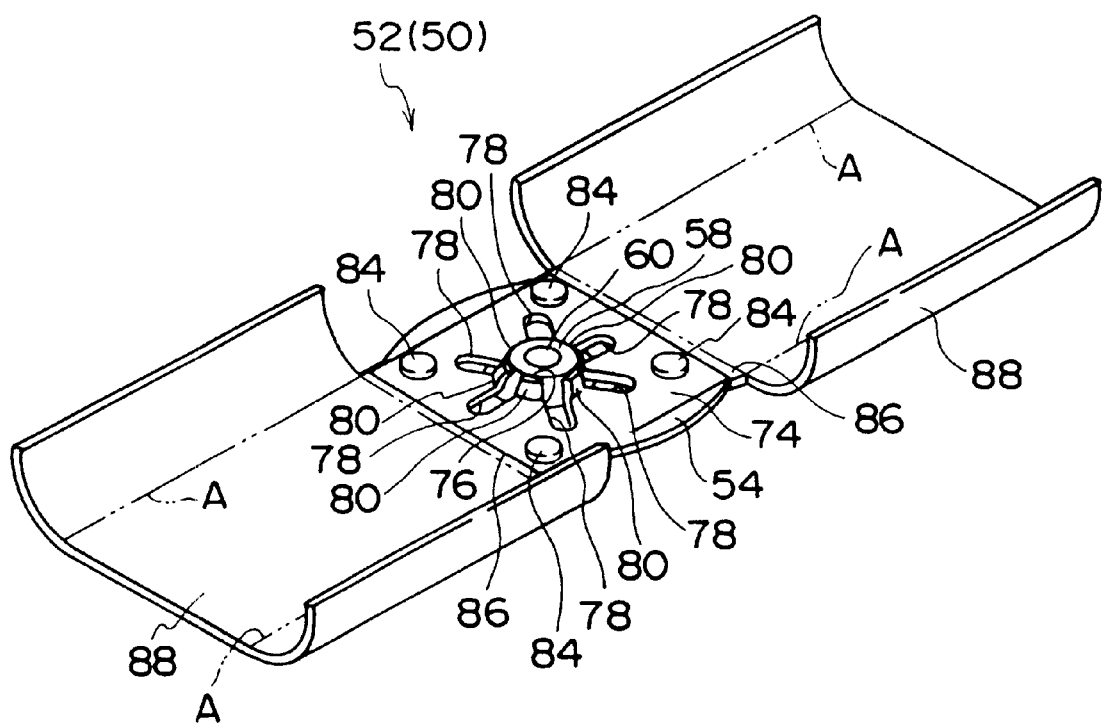
FIG. 12 is a perspective view showing the base plate after the side wall is bent arcuately.

Next, in a bending process, as shown in FIG. 12, each side wall 88 is bent upwardly along lines A (FIGS. 8 and 9) to have the same curvature as the arcuate periphery of the bottom wall 54. Under this condition, the base plate 52 is bent upwardly along the bending width until the side wall 88 becomes perpendicular to the bottom wall 54 and the side wall 88 defines an enclosed spaces therein except the opening at the upper end. As a result, as shown in FIGS. 3 and 6, the straight sides of one side wall 88 abut the straight sides of the other side wall 88 at the line G. Further, the side walls 88 become symmetric with respect to the axis (line H in FIG. 8) of the through hole 62.

Generally, in the bending process such as bending by the use of press-machining dies, the accuracy of bending is increased by designing the radius of bending a workpiece (base plate 52) to be small enough and designing the longitudinal length of the side wall 88 to be large enough. Further, in the bending process, the accuracy of shaping is greatly improved by adding a coining pressure to limit the spring-back and warpage of the side wall 88. Thus, the dimension of the base plate 52 can be accurately maintained even after the bending process, and the position of the through hole 62 can be accurately ensured.

According to the present invention, because the yoke 50 is manufactured without being subjected to the deep-drawing process, not only the machining oil which is used in the deep-drawing process need not be used but also machining debris which is produced in the deep-drawing process is not produced. Thus, flushing process for removing the machining oil and the debris is not necessitated. As a result, lubricating oil provided in the bearing hole 60 for the bearing metal 58 will not be removed.

Further, the machining process including the die-cutting and the shaping process including the bending are enabled to be sequentially performed without the flushing process therebetween, and those processes from the die-cutting to the bending is enabled to be automated to reduce the manufacturing cost.

Further, in the above manufacturing process of the yoke 50, the resilient plate 74 is fixedly attached to the base plate 52 before the base plate 52 is bent to form the bottom wall 54 and the side wall 88. That is, because the base plate 52 is generally in a flat plate shape although it is formed with the bearing accommodating holder 56 and the protrusions 84, the metal band 108 can be moved to and away from the base plate 52 without being impeded by the side wall 88 or the like. Thus, the manufacturing process is enabled to be automated.

The yoke 50 is then mounted in the motor chamber 22 of the casing 16 in a manner that the bottom wall 54 is placed on the intermediate wall 18 and that the opening of the yoke 50 is located near the upper opening of the casing 16.

Next, in a magnet fitting process, the permanent magnets 90 are disposed inside the yoke 50, and the springs 92 are interposed between the permanent magnets 90. The springs 90 bias the permanent magnets 90 toward the side wall 88.

In this fitting process, each permanent magnet 90 is positioned in such a manner that its lateral center is in alignment with the line G where the edges of the side wall 88 meet. Each permanent 90 is disposed so that either of its N-pole or S-pole faces the side wall 88 to form a magnetic circuit through one pole of the permanent magnet 90, the side wall 88 and the other pole of the permanent magnet 90. Thus, the magnetic flux generated by the permanent magnet 90 passes the side wall 88 in generally a radial direction without crossing the line G. As a result, the magnetic flux in the magnetic circuit does not leak from the part of abutment (line G) of the side wall 88.

As described above, the thickness of the side wall 88 is made to have a uniform thickness, because the yoke 50 of the motor 10 is formed by die-cutting the flat metal plate and by bending. Thus, the magnetic characteristics of the motor 10 can be improved than in a motor in which a yoke is formed by a deep-drawing process.

Further, the shape of the yoke 50 can be maintained without welding the straight opposing edges of the side wall 88, because the yoke 50 is fitted generally tightly in the casing 16. Thus, the manufacturing work can be simplified because no welding or joining process for the straight opposing edges of the side wall 88 is necessitated.

Figure 13:
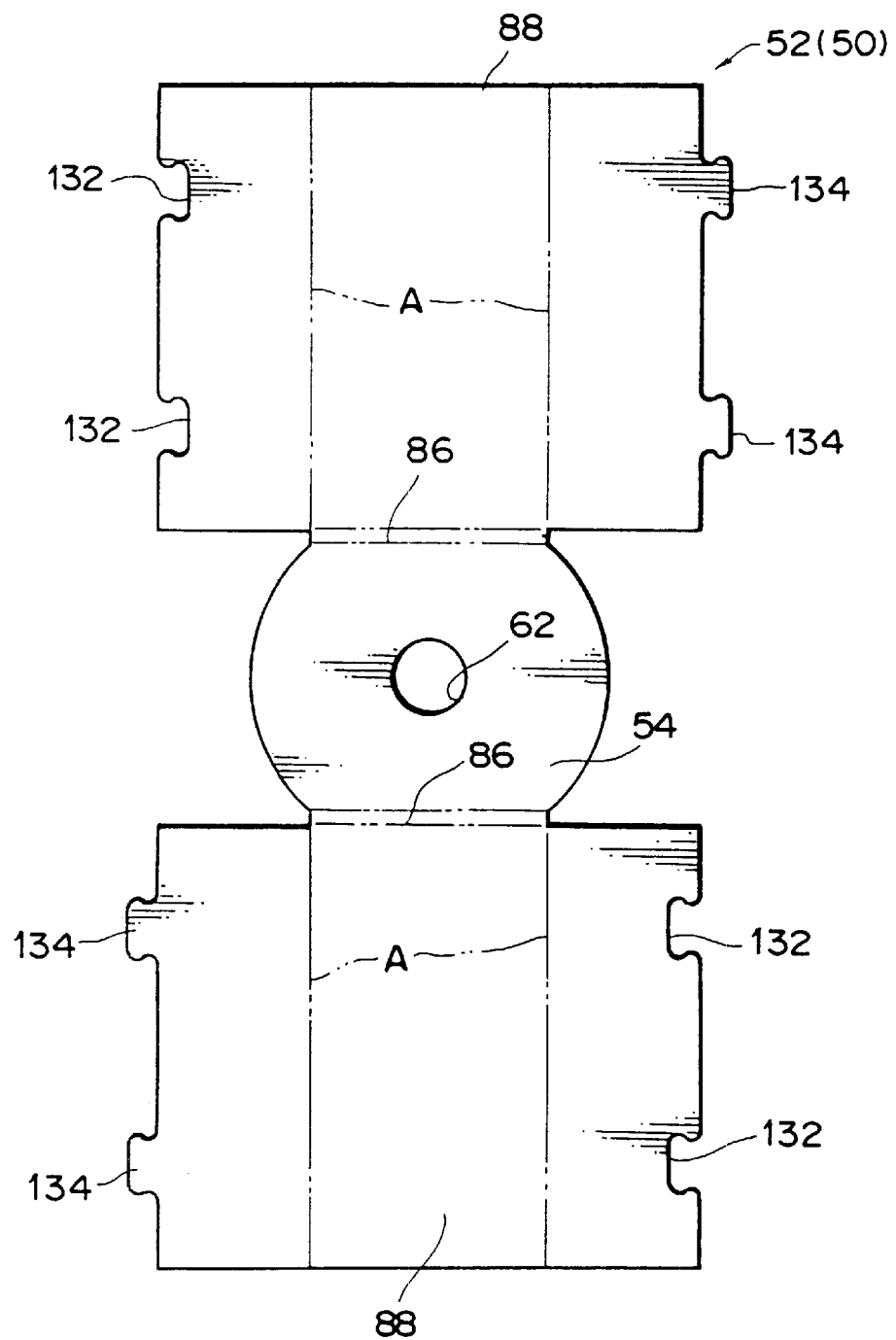
FIG. 13 is a plan view showing the base plate for the yoke according to a modification of the first embodiment.
Figure 14:
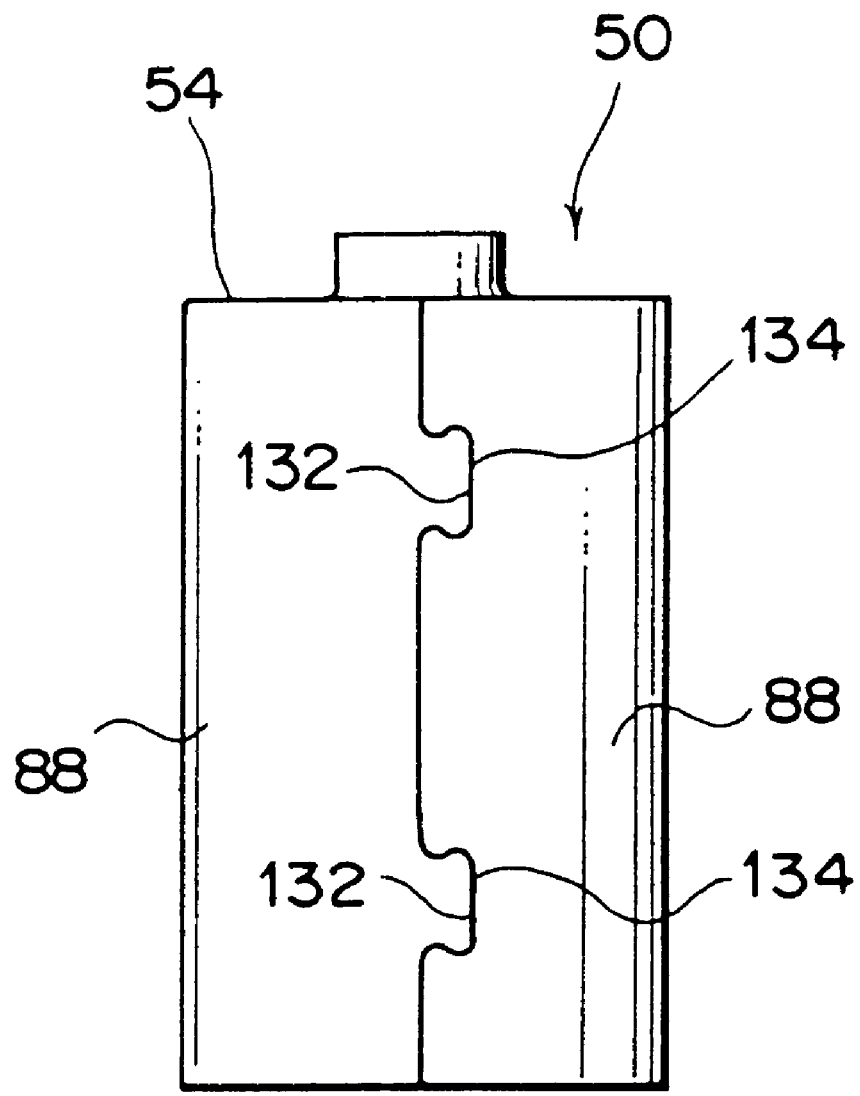
FIG. 14 is a side view showing the base plate after bending into the yoke according to the modification of the first embodiment.

In the case that the casing 16 is not used and the straight opposing edges of the side wall 88 is necessitated to be tightly joined, each side wall 88 is preferred to be shaped to have concavities 132 and convexities 134 as shown in FIGS. 13 and 14. The concavities 132 and convexities 134 are formed when the metal plate is die-cut into the shape of the base plate 52. The concavities 132 and the convexities 134 of one side wall 88 are fitted with the convexties 134 and concavities 132 of the other side wall 88, respectively, after the bending of the side wall 88. Thus, the expansion of the side wall 88 is prevented even when an external force is applied from the inside of the yoke 50.

Second Embodiment

Figure 15:
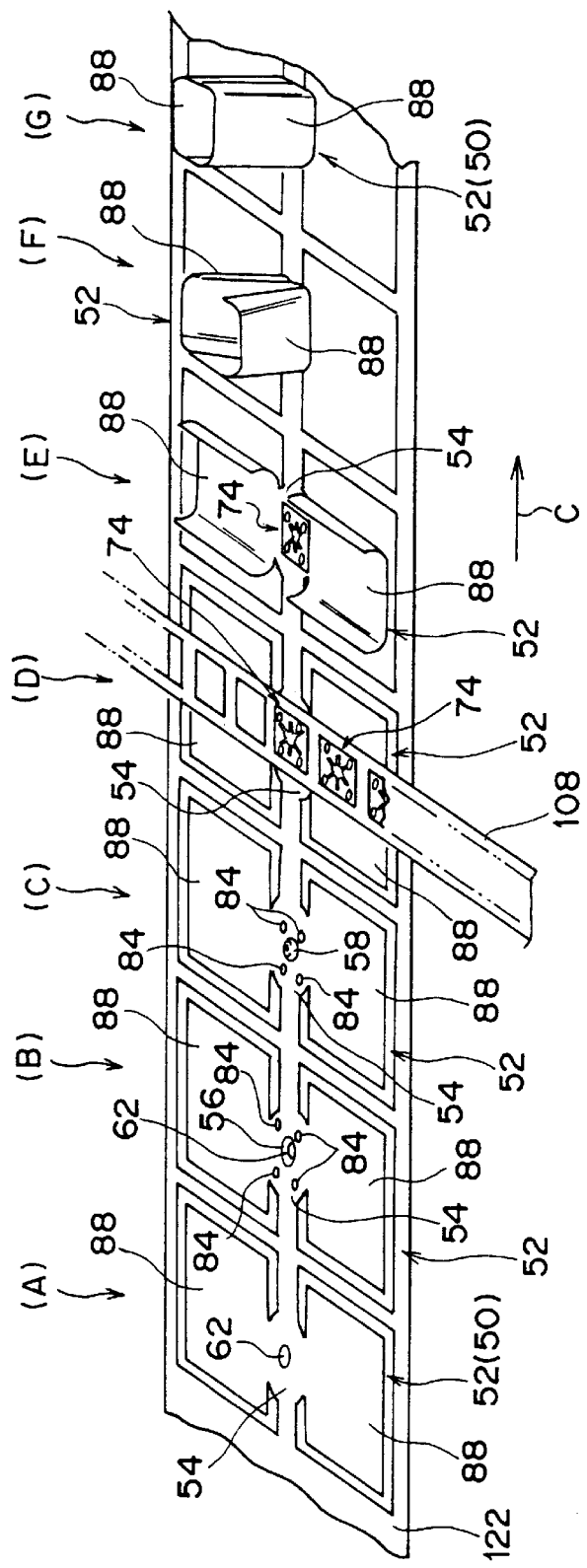
FIG. 15 is a perspective view showing a sequence of processes by which the yoke is manufactured according to a second embodiment of the present invention.

As shown in FIG. 15, the second embodiment is differentiated from the first embodiment in that a flat metal band 122 is die-cut to have a plurality of base plates 52 in series. Although not shown in the figure, both longitudinal ends of the metal band 122 is rolled. Various dies used to manufacture the yoke 50 in the first embodiment are arranged along the longitudinal direction of the metal band 122.

That is, the dies for die-cutting the metal band 122 into the base plate 52 are located at positions (A) and (B) which are at one longitudinal side of the metal band 122. The dies at the position (A) is for die-cutting the metal band 122 to shape the outer peripheral configuration of the base plate 52 and the through hole 62 for the rotary shaft 72. The dies at the position (B) is for shaping the protrusions 84 and the bearing accommodating holder 56 on the base plate 52 when the metal band 122 is moved in the direction C. Thus, according to the second embodiment, the dies for die-cutting and the dies for shaping (plastically deforming) are provided separately. Further, the base plate 52 is not die-cut completely away from the metal band 122 but is still maintained as connected to the metal band 122 at the bottom wall 54 even after the die-cutting process.

Various devices such as robot arms are located at a next position (C) which is opposite the position (A) with respect to the position (B), so that the bearing metal 58 is placed at the position (C). The dies for fitting the resilient plate 74 and fixing the bearing metal 58 are located at a next position (D).

The dies for bending the side wall 88 arcuately in correspondence with the curvature of the outer periphery of the bottom wall 54 in the bending process are located at a next position (E). Further, the dies for bending the side wall 88 perpendicularly from the bottom wall 54 in the bending process is located at a next position (F).

A cutter device is located at a final position (G) for cutting the base plate 52, particularly the bottom wall 54, away from the metal band 122.

The metal band 122 which is subjected to the above processes are rolled a predetermined distance in the direction C, so that the section shown in FIG. 15 is moved in the direction C. Because the base plate 52 is connected unitarily with the remaining part of the metal band 122 until the bending process is completed at the position (F), the base plate 52 need not be positioned accurately piece by piece relative to each die and device located at the positions (A) to (G). Further, the metal band 122 is sliding-moved in the direction C so that each process is performed at the respective positions, thus enabling automation of the yoke manufacturing process.

Third Embodiment

Figure 16:
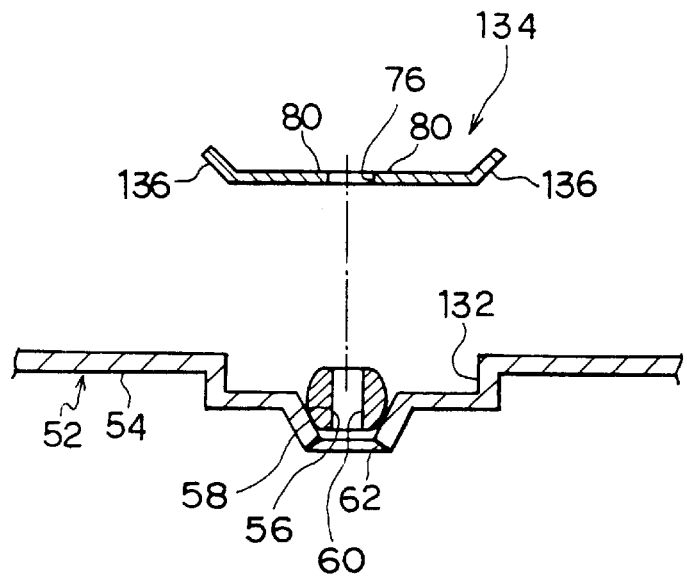
FIG. 16 is a sectional view showing the base wall and the resilient plate before being assembled according to a third embodiment of the present invention.

As shown in FIG. 16, the third embodiment is differentiated from the first embodiment in that the bottom wall 54 is formed with a recess 132, and the bearing accommodating holder 56 is formed in the radial center of the recess 132. A resilient plate 134 is fitted in the recess 132. The resilient plate 134 is similar to the resilient plate 74 except that it has not any protrusions 84 provided in the first and second embodiments. The resilient plate 134 has an inclined side wall part 136 which extends upwardly and radially outwardly from the flat part.

Figure 17:
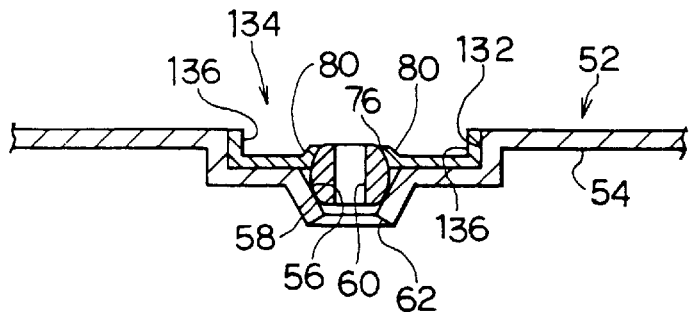
FIG. 17 is a sectional view showing the base wall and the resilient plate after being assembled according to the third embodiment of the present invention.

The resilient plate 134 is press-fit in the recess 132 under the condition that the bearing metal 58 is placed in position on the holder 56. The outer peripheral configuration of the resilient plate 132 is substantially the same as the peripheral configuration of the recess 132. When the resilient plate 134 is inserted in the in the recess 132, the side wall part 136 resiliently deforms by the force from the inner periphery of the recess 132 so that the resilient plate 134 is tightly fitted in the recess 134 while pressing the bearing metal 58 as shown in FIG. 17.

In the third embodiment, the resilient plate 134 may alternatively be tightly fitted in the recess 132 by plastically deforming a part of the bottom wall 54 at around the periphery of the recess 132 after disposing the resilient plate 134 in the recess 132 in contact with the bearing metal 58. Further, the resilient plate 134 is not disengaged from the recess 132, even when the side wall part 136 plastically deforms at the time of fitting the resilient plate 134 into the recess 132.

In the first to third embodiments, the rotary shaft 72 need not always protrude from the yoke 50 but may be accommodated entirely within the yoke 50. In this instance, the through hole 62 for passing the rotary shaft 72 need not be provided in the bottom wall 54 of the yoke 50.

Further, the lateral edges of the side wall 88 need not necessarily be in abutment with each other at the line G. Even if the lateral edges of the side wall 88 are separated from each other, the leakage of the magnetic flux through spacings between the separated lateral edges can be reduced to a minimum as long as the lateral center of the arcuate part of the side wall 88 and the lateral center of the permanent magnets 90 are alined in line near the line G.

The electrical motor according to the above embodiments may be applied to other devices such as an electrically-driven vehicular rear view mirror, vehicular air conditioner, audio device or the like.

The above embodiments may further be modified or changed without departing from the spirit of the present invention.

What is claimed is:

1. A yoke manufacturing method comprising the steps of:

die-cutting a flat metal plate into a base plate which includes a bottom wall and a side wall unitary with the bottom wall;

plastically deforming a part of the bottom wall of the base plate to provide a protrusion on the bottom wall;

fitting a bearing member substantially in a center of the bottom wall of the base plate, the bearing member being for supporting a rotary shaft of an electrical motor, said fitting comprising placing the bearing member on the bottom wall of the base plate, placing a resilient member on the bearing member, engaging the resilient member with the protrusion of the bottom wall via a through hole formed in the resilient member, and fixing the resilient member to the bottom wall of the base plate to resiliently bias the bearing member toward the bottom wall of the base plate, said fixing comprising plastically deforming the protrusion of the bottom wall of the base plate to tightly fix the resilient member to the bottom wall of the base plate; and bending the base plate at a junction between the bottom wall and the side wall, and bending the side wall to correspond to an outer peripheral configuration of the bottom wall, thereby forming a yoke of the electrical motor.

2. The yoke manufacturing method of claim 1, wherein:

the metal plate die-cutting step die-cuts a through hole in the center of the bottom wall of the base plate, the through hole being for passing the rotary shaft therethrough.

3. The yoke manufacturing method of claim 2, wherein:

the metal plate die-cutting step plastically deforms a central part of the bottom wall of the base plate to provide a bearing holder in the bottom wall for rotatably accommodating the bearing member in the bearing holder.

4. The yoke manufacturing method of claim 1, wherein:

the metal plate die-cutting step plastically deforms a central part of the bottom wall of the base plate to provide a bearing holder in the bottom wall for rotatably accommodating the bearing member in the bearing holder.

5. A yoke manufacturing method comprising the steps of:

die-cutting a flat metal plate into a base plate which includes a bottom wall and a side wall unitary with the bottom wall;

fitting a bearing member substantially in a center of the bottom wall of the base plate, the bearing member being for supporting a rotary shaft of an electrical motor;

bending the base plate at a junction between the bottom wall and the side wall, and bending the side wall to correspond to an outer peripheral configuration of the bottom wall, thereby forming a yoke of the electrical motor; and separating the base plate from the metal plate, wherein the metal plate is in a form of an elongated metal band; and wherein the metal plate die-cutting step die-cuts the metal band into a shape the base plate while holding the base plate integrally therewith so that the bearing member fitting step and the base plate bending step are performed before the base plate is separated from the metal band.

* * * * *